United States Patent [19]

Barry

[11] 4,017,386
[45] Apr. 12, 1977

[54] MAGNETIC SWEEPER

[75] Inventor: Samuel M. Barry, Chicago, Ill.

[73] Assignee: The Raymond Lee Organization, Inc., New York, N.Y.; a part interest

[22] Filed: Oct. 28, 1975

[21] Appl. No.: 626,171

[52] U.S. Cl. .............................. 209/215; 15/159 A; 56/400.17; 209/223 R
[51] Int. Cl.² ............................................ B03C 1/30
[58] Field of Search .............. 209/215, 217, 232 R; 335/284; 15/105; 56/400.17

[56] References Cited

UNITED STATES PATENTS

| 555,546 | 3/1896 | Whitacre | 209/217 |
| 966,855 | 8/1910 | Phillips | 209/217 |
| 1,137,492 | 4/1915 | Kidney | 209/217 |
| 1,831,393 | 11/1931 | Pierce | 335/284 |
| 2,226,287 | 12/1940 | Miller | 209/215 X |
| 2,827,168 | 3/1958 | Bowers | 209/215 |
| 3,377,641 | 4/1968 | McGregor | 209/215 X |

FOREIGN PATENTS OR APPLICATIONS 336,282  3/1920  Germany .................... 209/217

Primary Examiner—Robert Halper
Attorney, Agent, or Firm—Howard I. Podell

[57] ABSTRACT

A broom or rake fitted with magnetizable tines for attracting ferrous debris, when the tines are magnetically energized. The tines extend into a tubular section of the handle of the tool in which the field of a magnetic element or electrical coil serves to magnetize the tines. The magnetic field may be turned off by means of an actuating lever or switch mounted in the handle of the tool so as to enable the tines to drop magnetic debris, and the lever or switch permits reversing of the magnetic field to eliminate residual magnetism formed in the tines after extended use.

6 Claims, 6 Drawing Figures

U.S. Patent        April 12, 1977        4,017,386
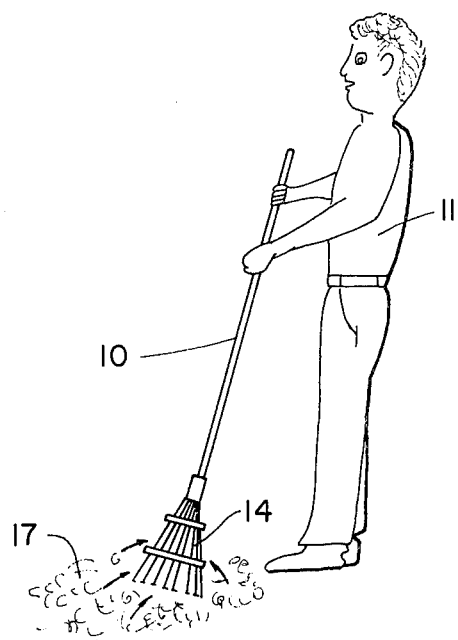
FIG. 1
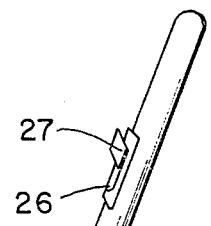
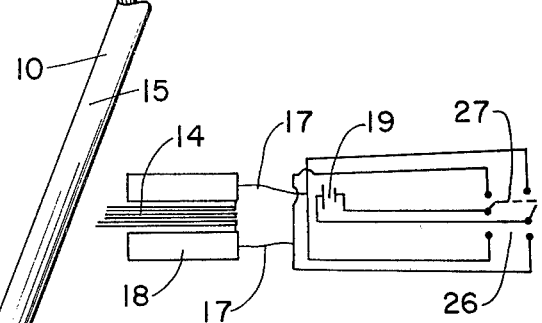
FIG. 5
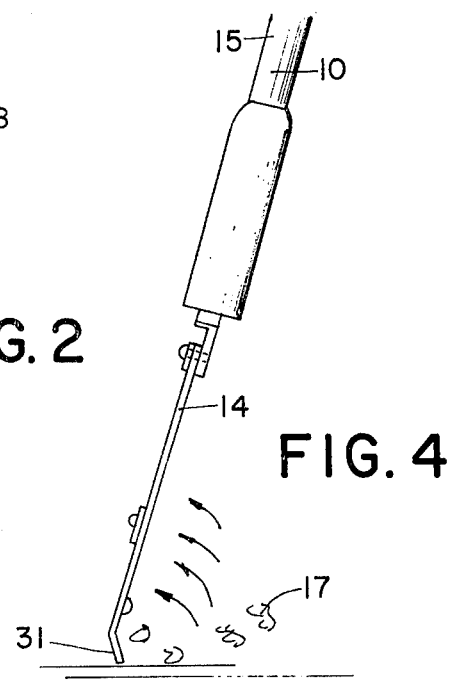
FIG. 2
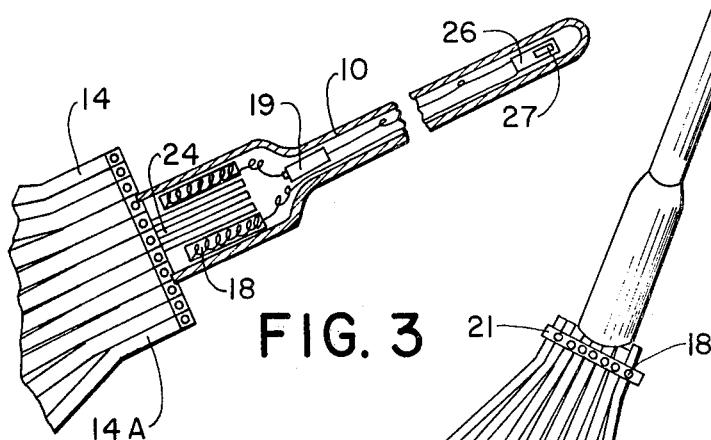
FIG. 3      FIG. 4
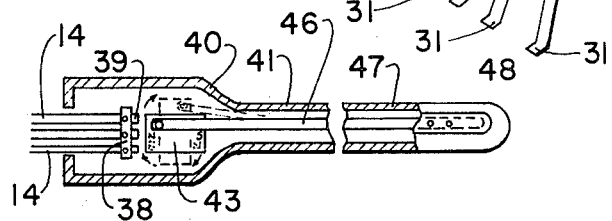
FIG. 6

MAGNETIC SWEEPER

SUMMARY OF THE INVENTION

My invention is a broom or rake fitted with magnetizable tines for attracting ferrous debris, when the tines are magnetically energized. The tines extend into a tubular section of the handle of the tool in which the field of a magnetic element or electrical coil serves to magnetize the tines. The magnetic field may be turned off by means of an actuating lever or switch mounted in the handle of the tool so as to enable the tines to drop magnetic debris, and the lever or switch permits reversing of the magnetic field to eliminate residual magnetism formed in the tines after extended use.

In the electrically energized embodiment of the tool, some of the tines extend into the core of an electrical coil energized by a battery in the handle, with a three position double throw switch controlling the energization or reversal of the coil magnetic field.

In the mechanical embodiment of the tool, a permanent magnet is rotatably mounted in the handle adjacent the ends of some of the tines with a rod attached to the magnet so as to rotate it into one of two positions in which a North or a South end of the magnet lies adjacent the tine ends or into a third position in which the magnet is rotated away from the tine ends. A lever projecting through a slot in the handle is fixed to the lever to permit the user to actuate the magnet as desired.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the invention in use;

FIG. 2 is an elevation view of the preferred embodiment of the invention;

FIG. 3 is a sectional view of the preferred embodiment of the invention;

FIG. 4 is a fragmentary end view of the preferred embodiment of the invention;

FIG. 5 is a schematic diagram of the electrical circuit of the preferred embodiment of the invention; and FIG. 6 is a sectional view of an alternate embodiment of the invention.

DESCRIPTION OF THE PREFERRED EMBODIMENT:

Turning now descriptively to the drawings, in which similar reference characters denote similar elements throughout the several views, FIGS. 1-5 illustrate the preferred embodiment of the invention in the form of a rake 10 fitted with magnetizable tines 14 fitted to a tubular handle 15 to enable a user 11 to pick up magnetizable debris 17 with the tines 14 being magnetically energized by the field of an electrical coil 18 mounted in the handle 15.

Tines 14 are formed of a material which is readily magnetized or demagnetized with the tines 14 and 14A joined by rivets 18 to one or more spreader bars 20 and 21. Some of the tines 14 extend into the handle 15, with other shorter tines 14A fixed to the tines 14 by the spreader bars 20 and 21.

Spreader bars 20 or 21 or both are formed of a material which conducts a magnetic field so as to join all tines 14 and 14A both mechanically and magnetically.

The ends 24 of tines 14 extend into the hollow core section of an electrical coil 18 which is wound so as to produce a magnetic field when electrically energized by battery 19 inside of handle 10, with battery 19 connected to coil 18 by wires leading to a double-throw, three position switch 26 controlled by switch handle 27. As shown in FIG. 5, switch 26 may be in a neutral OFF position in which coil 18 is de-energized, or switch 26 may be in one of two ON positions. Switch 26 is wired to battery 19 and coil 18 so that the polarity of the conductors 17 leading to coil 18 are reversed in the alternate ON position of switch 26 serving to respectively cause coil 18 to induce one of two opposite magnetic fields about tines 14.

In a first ON position of switch 26, tines 14 and 14E are magnetized by coil 18 so that the sweeping ends 31 are magnetized with a North polarity, for pick up of magnetic attractable debris 17. When it is desired to drop debris 17 off the tines 14 and 14A, switch 26 is turned to the OFF position. Any residual magnetism in the tine ends 31 is eliminated by momentarily actuating switch 26 to the second ON position to reverse the polarity of tine ends 31 to a South polarity. Switch 26 may be of the construction to remain in the first said ON position, or the OFF position when the lever 27 is moved to either of said ON or OFF positions but to be spring-biased to move from the second ON position to the OFF position except when manual pressure is maintained on switch lever 27 holding it in the said second ON position.

FIG. 6 illustrates an alternate embodiment of the tool 40 in which the tines 14 and 14A are mechanically magnetized, as desired, by the field of permanent magnet 43 rotatably mounted by pin 44 in handle 41.

Magnet 43 is rotated into one of three positions by pivotably attached rod 46 which extends to the free end 47 of handle 41, a lever 48 is fixed to rod 46 and fits through a slot 48 in the handle 41 so that the user may rotate magnet 43 by moving lever 48 in an axial direction in slot 48.

Tines 14 are joined at their internal ends 39 by a transverse rib 38, with magnet 43 mounted so that in a first position, the North pole of the magnet is adjacent tine ends 39, and in a second position the South pole of the magnet is adjacent tine ends 39. In a third position shown by dash lines, magnet 43 may be rotated so that neither pole end North or South of magnet 43 is adjacent the tine ends 39 to remove the magnet field from the tines 14. Lever 48 and rod 46 may be spring-biased to hold lever 48 and magnet 43 in either of the said first or third positions, but to return lever 48 and magnet 43 from the said second position to the OFF third position, except when the lever 48 is manually held in the said third position.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A rake, the tines of which are magnetizable for the attraction and retention of magnetically attractable debris, comprising a handle section mounted at one end to a hollow housing, with a plurality of rake tines joined together by one or more spreader bars, said rake tines and spreader bar each being formed of a magnetizable material, said tines comprising a first set of said rake tines extending into said housing, and a second set of rake tines which do not extend into the housing, magnetic means mounted in said housing to magnetize the sections of the first set of tines extending into said housing, said spreader bars serving to conduct the magnetic field from said first set of tines to the said second set of tines.

2. The combination as recited in claim 1 in which the magnetic means are controlled by a movable lever projecting externally of the handle housing, so as to enable the tines to be magnetized by said means when the lever is in a first of a plurality of alternate positions.

3. The combination as recited in claim 2 in which the tines are uncoupled from the magnetic means when the lever is in a second position.

4. The combination as recited in claim 2 in which the magnetic field of the tines is reversible by moving the lever from the first position to a third position.

5. The combination as recited in claim 1 in which the magnetic means is in the form of a permanent magnet.

6. The combination as recited in claim 1 in which the magnetic means is in the form of an electrical coil.

* * * * *